(12) United States Patent
Bray et al.

(10) Patent No.: US 7,723,894 B2
(45) Date of Patent: May 25, 2010

(54) ELECTRICAL MACHINE WITH IMPROVED LOSS CHARACTERISTICS AND METHOD OF MAKING SAME

(75) Inventors: James William Bray, Niskayuna, NY (US); Kiruba Sivasubramaniam, Clifton Park, NY (US); Manoj Ramprasad Shah, Latham, NY (US)

(73) Assignee: General Electric Company, Niskayuna, NY (US)

( * ) Notice: Subject to any disclaimer, the term of this patent is extended or adjusted under 35 U.S.C. 154(b) by 728 days.

(21) Appl. No.: 11/018,592

(22) Filed: Dec. 20, 2004

(65) Prior Publication Data

US 2006/0131981 A1    Jun. 22, 2006

(51) Int. Cl.
*H02K 1/22* (2006.01)
(52) U.S. Cl. .................................... 310/261.1
(58) Field of Classification Search ................ 310/261, 310/DIG. 2, DIG. 6, 261.1
See application file for complete search history.

(56) References Cited

U.S. PATENT DOCUMENTS

| | | | | |
|---|---|---|---|---|
| 1,659,623 A * | 2/1928 | Barr | ............................. | 310/63 |
| 2,547,599 A * | 4/1951 | Roters | ........................ | 318/701 |
| 3,488,539 A * | 1/1970 | Tucker | ....................... | 310/268 |
| 4,409,506 A * | 10/1983 | Ito et al. | ...................... | 310/166 |
| 4,843,271 A | 6/1989 | Shah | ........................... | 310/217 |
| 5,118,979 A | 6/1992 | Shih et al. | | |
| 5,246,565 A | 9/1993 | Mignardot | | |
| 5,773,909 A * | 6/1998 | Hansen et al. | ............... | 310/261 |
| 6,141,856 A | 11/2000 | Johnson et al. | ................ | 29/598 |
| 6,178,623 B1 * | 1/2001 | Kitazawa et al. | .............. | 29/825 |
| 6,291,919 B1 | 9/2001 | Ganti et al. | | |
| 6,531,801 B1 | 3/2003 | Blazek et al. | ................ | 310/261 |
| 6,677,692 B1 * | 1/2004 | Sato et al. | ...................... | 310/89 |
| 2006/0043810 A1 * | 3/2006 | Shimizu et al. | ......... | 310/156.08 |

FOREIGN PATENT DOCUMENTS

| | | |
|---|---|---|
| DE | 4420250 A1 | 12/1995 |
| GB | 2378586 A | 2/2003 |
| JP | 56000298 A | 1/1981 |
| WO | WO 2004/068673 A2 * | 8/2004 |

* cited by examiner

*Primary Examiner*—Dang D Le
(74) *Attorney, Agent, or Firm*—Fletcher Yoder (57) ABSTRACT

An electrical machine includes a stator and a rotor. The stator has a central opening that is configured to receive the rotor. The rotor includes a generally cylindrical first section comprising a first material mounted on an axially extending shaft within the central opening. The rotor further includes a second section having a second material of a predetermined thickness that is plated integrally over at least a portion of the first section. The second material has a higher electrical conductivity relative to the first material. In certain embodiments, the electrical machine may include a stator support structure having a clamping member comprising a first material and configured to rigidly position the stator around the rotor. The stator support structure further includes an electrically conductive layer comprising a second material plated integrally over the clamping structure, wherein the second material has a higher electrical conductivity relative to the first material.

17 Claims, 6 Drawing Sheets

ELECTRICAL MACHINE WITH IMPROVED LOSS CHARACTERISTICS AND METHOD OF MAKING SAME

BACKGROUND

The invention relates generally to an electrical machine, and more particularly to a rotor of an electrical machine, such as a motor and/or generator. Specifically, embodiments of the present technique provide improved loss characteristics in an electrical machine.

Typically, an electrical machine includes a rotor and stator that are utilized to convert electrical power to mechanical power or vice versa. The stator generally includes a large number of laminations of a magnetic material that are stacked together. Within the center of the laminations, a central opening is formed throughout the length of the stator. The rotor may also include magnetic materials that are mounted on a shaft, which is disposed within the central opening of the stator.

The stator may include coils or windings that form magnetic poles in the stator, while the rotor may also include windings or be a solid portion of magnetic material. For instance, the stator may include windings that are located adjacent to the central opening of the stator, while the rotor may include windings that are located on the outside of the rotor adjacent to the stator.

Generally, a time-varying magnetic field is capable of producing eddy currents in electrically conductive materials, such as those from which the stator and rotor are formed. The magnetic metals usually exhibit a relatively high electrical resistivity. Because eddy current formation primarily depends on electrical and magnetic properties of the rotor surface, the magnetic fields produced around the rotor induce eddy currents in the rotor. These eddy currents dissipate energy via resistive heating in the rotor that increases the temperature of the rotor. As a result, eddy currents reduce the efficiency of the electrical apparatus and present thermal problems for the electrical apparatus. Further, the transient behaviors of the electrical machine are, in part, dictated by the rate at which induced eddy currents decay in the rotor surface. Thus, these eddy currents may impact the operation of the electrical machine.

To reduce the heat from the eddy currents, the electrical and magnetic properties of the rotor surface may be modified by attachments to address these problems. However, such attachments may not be advantageous in electrical machines operating at high speeds, such as speeds exceeding 10,000 revolutions per minute because the centrifugal forces and centrifugal stress imposed on such attachments by rotation of the rotor may cause the attachments to disintegrate from the rotor.

Accordingly, there exists a need for controlling rotor magnetic and electrical properties, especially near the surface of the rotor, while providing a desirable mechanical strength for use in high-speed electrical machines.

BRIEF DESCRIPTION

The present techniques accordingly provide a novel approach to obviate the aforementioned problems. In one embodiment of the present techniques an electrical machine having a stator and rotor is provided. The rotor is disposed within a central opening in the stator. The rotor includes a generally cylindrical first section comprising a first material mounted on an axially extending shaft within the central opening. The rotor further includes a second section having a predetermined thickness and comprising a second material plated integrally over at least a portion of the first section. The second material has a higher electrical conductivity relative to the first material.

In another aspect, a rotor for an electrical machine is provided. The rotor includes a generally cylindrical first portion comprising a first material. The rotor further includes a second portion comprising a layer of a second material plated integrally over the first portion. The layer has predetermined thickness, and the second material has a higher electrical conductivity relative to the first material.

In yet another aspect, a method for manufacturing a rotor is provided. The method includes fabricating a generally cylindrical first section of a rotor from a magnetic material. The method further includes plating a second section over at least a portion of the first section of the rotor. The second section comprises an electrically conductive material that is applied at a predetermined radial thickness over the first section. The electrically conductive material is configured to exhibit a higher electrical conductivity relative to the magnetic material.

In still another aspect, a method is provided for applying a conductive layer over a rotor of an electrical machine. The method includes determining a thickness of the conductive layer to provide specific surface properties based on operating parameters of the electrical machine. The method further includes plating the conductive layer of an electrically conductive material over a surface of the rotor based on the calculated thickness, wherein the conductive layer is configured to exhibit a higher electrical conductivity than the rotor.

In yet another aspect, an electrical machine is provided including a stator core having a plurality of laminations and a rotor disposed within the stator core. The electrical machine further includes a stator support structure having a clamping member comprising a first material and configured to rigidly position the stator around the rotor. The stator support structure further includes an electrically conductive layer comprising a second material plated integrally over the clamping structure, wherein the second material has a higher electrical conductivity relative to the first material.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The techniques discussed below involve plating of a conductive material on the metal surface of the rotor in high-speed electrical machines. The materials plated on the rotor surface are configured to have controlled and specified thickness and electrical conductivity. These materials improve rotor surface properties that reduce eddy current losses on the pole faces in high speed electrical machines. Certain embodiments of the present techniques are described hereinafter referring generally to FIGS. 1-6.

Figure 1:
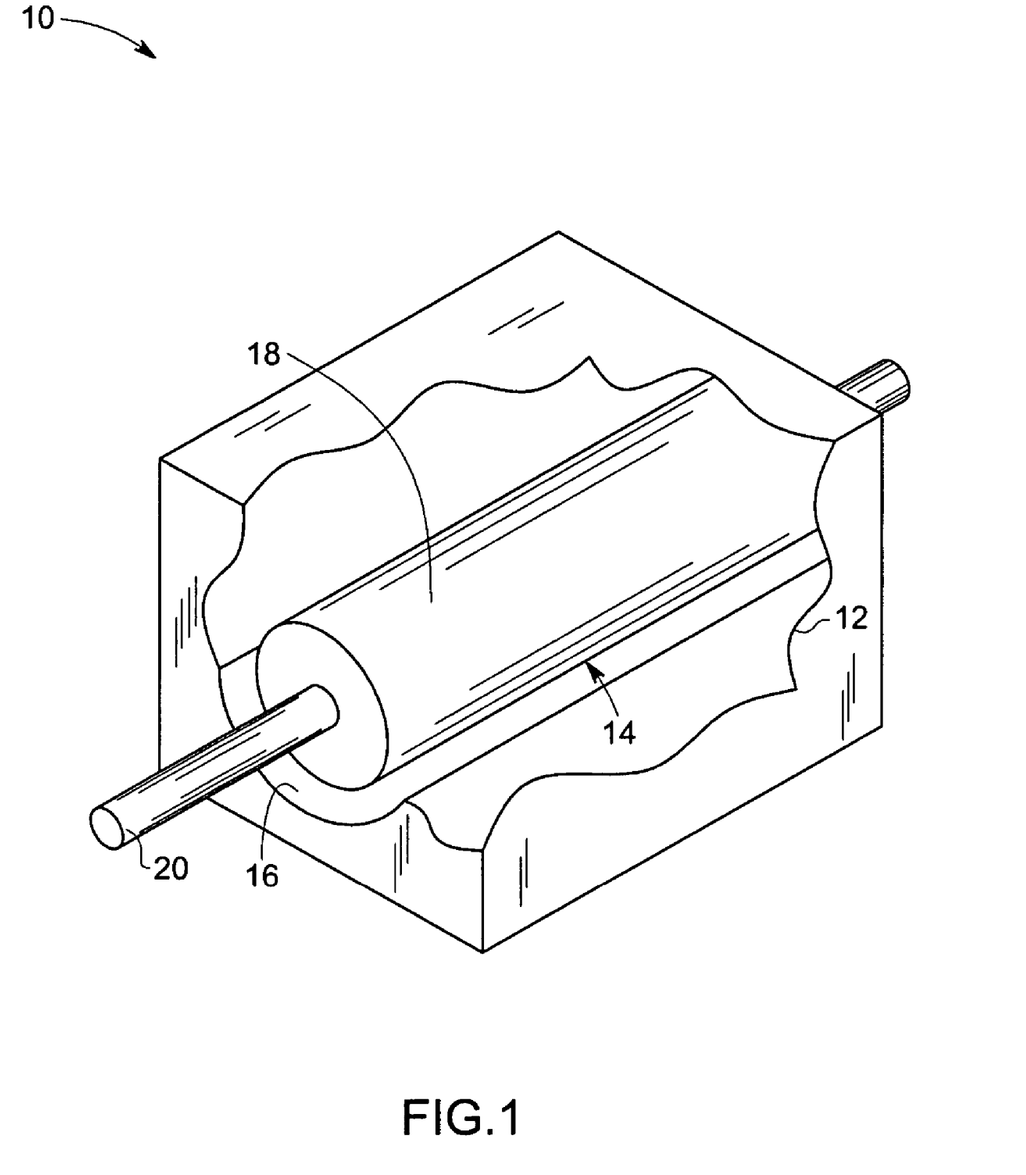
FIG. 1 is a partial perspective view of an electrical machine in accordance with aspects of the present techniques.

Referring to FIG. 1, an electrical machine 10 is illustrated in accordance with aspects of the present techniques. The electrical machine 10 may include, for example, a motor or a generator. As illustrated, the electrical machine 10 includes a stator 12 and rotor 14 that are utilized for energy (or power) conversion. The stator 12 has a central opening 16 extending along the length of the stator 12 that surrounds rotor 14. The stator 12 generally includes multiple laminations (not shown) of at least one magnetic material that are stacked together. The rotor 14 comprises a generally cylindrical section 18 mounted axially on a shaft 20. The cylindrical section 18 of the rotor 14 is generally fabricated from a magnetic material, such as magnetic steel. In certain embodiments, the shaft 20 may be formed integral to the generally cylindrical section 18.

The electrical machine 10 may be adapted for low speed or high speed operation. Low speed electrical machines are used, for example, as propulsion motors in electric ship drives. In the low speed operation, the rotor speeds generally do not exceed a few hundred revolutions per minute (rpm). In contrast, in high-speed electrical machines, such as those used as compact generators, the rotor speeds may exceed 10,000 rpm. In one embodiment of a high speed electrical machine, such as a high-speed motor, the cylindrical magnetic section 18 of the rotor 14 may be adapted to conduct electrical current to magnetize the rotor 14, which, when subject to the time-varying AC magnetic fields produced by the stator windings, causes the rotor 14 to rotate.

Generally, eddy currents are not generated when the rotor spins synchronously with the rotating magnetic field produced by the stator 12 because, in such a case, each point on the rotor 14 experiences a substantially constant magnetic field. However, in many applications, this synchronous operation of the rotor 14 with the stator 12 is not maintained. For example, certain motor applications employ switching devices, such as thyristors or silicon-controlled rectifiers, to synthesize AC power having a desired frequency and amplitude for application to the stator 12. The AC power synthesized by such switches, in addition to the desired fundamental frequency, also contains substantial undesired harmonics. As known to those skilled in the art, harmonics represent sharp transitions of high frequencies in the current or voltage waveforms. This exposes the stator 12 and rotor 14 to variations in magnetic field at the harmonic frequencies, thereby generating eddy currents that cause excessive heat of the surface of the rotor 14.

In the stator 12, the eddy current losses are reduced because of the relatively thin, mutually insulated laminations of the magnetic metal. The thinness of each lamination, and its insulation from its neighbors, provides an extremely resistive path, thereby limiting the induced eddy currents. However the use of such laminations is not advantageous in limiting eddy current losses in the rotor 14 because the stress imposed by rotation of the rotor at high-speed operation may cause a laminated structure to fail.

In the rotor 14, the eddy currents produced from the non-synchronous operation in the electrical machine 10 may be a result of high frequency harmonics of stator excitation circuitry (not shown). The eddy currents are generally localized to the surface of the rotor 14, which is referred to as the skin effect. This localization of the eddy currents tends to confine high frequency power loss to the surface, leaving the interior of the rotor 14 relatively loss-free. Hence, in accordance with the present techniques, the surface of the cylindrical section 18 of the rotor 14 is plated with a material having a high electrical conductivity relative to that of the magnetic material. Because the amount of heat and power dissipation varies proportionally with the resistance of the material through which it passes, plating the rotor 14 with a highly conductive material may reduce the amount of power dissipated by eddy currents, while not presenting the problems with machine operation.

In other attachment methods, the electrical and magnetic properties of the rotor surface may be modified by enveloping the rotor in a high conductivity material, or by mechanically attaching higher conductivity materials to the rotor surface, such as high conductivity amortisseur (damper) bars or wedges. However, as mentioned earlier, such techniques may be undesirable in high-speed applications, as the centrifugal stress imposed on such attachments by rotation of the rotor at high speeds may cause them to disintegrate from the rotor because of the stresses involved with high speed operation. That is, the conductive coatings and mechanical attachments may not provide a bond that is strong enough to withstand the forces exerted by the high-speed operation. Unusual rotor shapes or curvatures may also make mechanical attachment difficult.

Further, other techniques, such as air-cooling of the rotor 14, may not be available to reduce the heat produced by eddy currents in high-speed electrical machines. For instance, air-cooling of the rotor 14 causes increased air-friction on the rotor 14, which is disadvantageous for high-speed operation. Specifically, for a rotor operating at speeds of about 10,000 revolutions per minute (rpm), air friction leads to increased windage losses that reduce the efficiency of the electrical machine 10. In fact, high-speed electrical machines are sometimes required to operate in a substantial vacuum to reduce windage losses. Further, the electrical design of some machines may not allow the air gap between rotor and stator to be large enough for good air cooling. Hence, air-cooling of the rotor 14 may not be practical in such applications.

Accordingly, a highly conductive material may be attached to the surface of the rotor 14 to reduce the heat and inefficiencies. For instance, a highly conductive material may be integrally plated onto the rotor surface because the plating leads to a stronger bond between the cylindrical section 18 and the high-conductivity layer. This stronger bond is particularly advantageous in high-speed applications wherein a high bond-strength between the cylindrical section 18 and the highly conductive layer is desirable to withstand centrifugal stresses imposed by high rotational speeds of the rotor 14. The conductive layer is discussed in greater detail below in FIG. 2.

Figure 2:
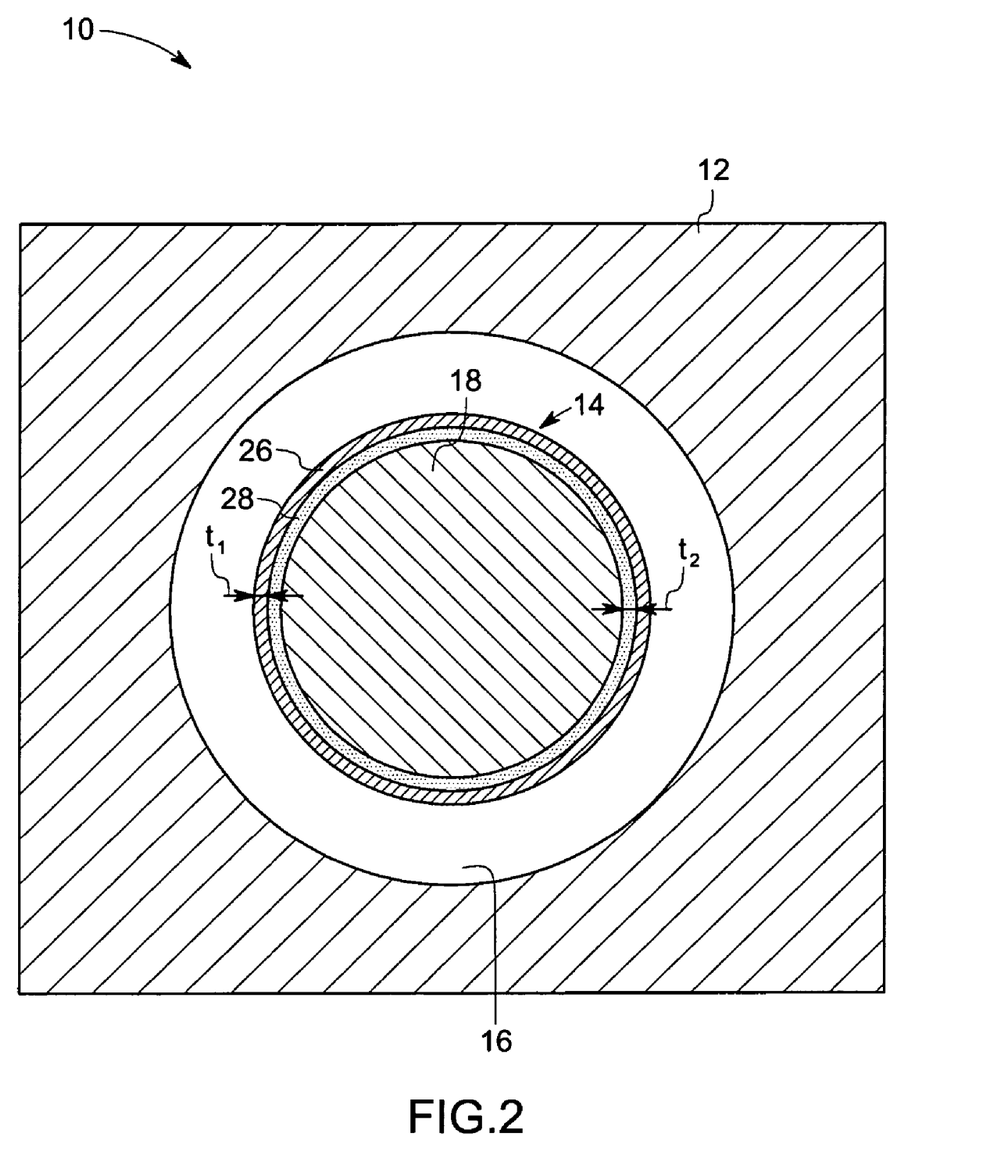
FIG. 2 is a cross-sectional view of a stator and windingless rotor formed in accordance with one embodiment of the present techniques.

FIG. 2 illustrates a front view of the electrical machine 10 of FIG. 1 in accordance with aspects of the present techniques. As illustrated, the rotor 14 includes a conductive layer 26 of a highly conductive material disposed over the magnetic cylindrical section 18 to a predetermined thickness $t_1$. As used herein, the term conductivity should be understood to refer to electrical conductivity. By "highly conductive," it is meant that the conductive layer 26 is adapted to exhibit a higher degree of electrical conductivity than the cylindrical section 18. One example of a highly conductive material includes copper, which exhibits high electrical conductivity, desirable corrosion resistant properties and is relatively inexpensive.

Further, copper also exhibits properties of high machinability and ductility (i.e. can be subject to bending and torsion without being subject to fatigue). Another example of a highly conductive material includes silver, which exhibits a higher electrical conductivity than copper. However, silver tends to tarnish and offers relatively lower mechanical strength in comparison to copper. In certain embodiments, the conductive layer 26 may comprise copper alloys, including, for example combinations of copper and silver, to achieve desired plating and adhesion properties, while maintaining balanced mechanical, electrical and thermal properties.

In addition to the conductive layer 26, a bonding layer 28 may be utilized to provide improved adhesion properties thus yielding a high bond-strength. That is, the bonding layer 28 may be disposed between the magnetic cylindrical portion 18 and the conductive layer 26 to increase the strength of the adhesion of the conductive layer 26 to the magnetic cylindrical portion 18. In one embodiment, the bonding layer 28 may include a layer of nickel that is plated on the surface of the cylindrical portion 18 to a predetermined thickness $t_2$. Beneficially, nickel provides a desired adhesion with copper, but exhibits a higher electrical resistivity (hence lower conductivity) than copper. Thus, the bonding layer may be applied at a certain thickness, such as thicknesses $t_1$ and $t_2$ of the conductive layer 26 and the bonding layer 28, based on calculated values that optimize the surface properties of the rotor 16. Many such bonding layers are known in the art of plating and are usually termed "strike layers".

To determine the thickness of the conductive layer 26 and the bonding layer 28, various factors may be utilized to determine the optimal thickness. For instance, the thickness $t_1$ of the conductive layer 26 and the thickness $t_2$ of the bonding layer 28 may be based on parameters calculated from electromagnetic field theory, as well as specific parameters of the particular machine. The design parameters may include, for example, stator winding details (for e.g. number of phases, number of coils of stator winding per phase, number of turns per coil, number of stator slots, number of winding layers, number of parallel circuits per phase, pitch ratio, etc.), various diameters (for e.g. stator winding inner and outer diameters, airgap diameter, rotor surface diameter, etc.), material properties of the stator and rotor (magnetic and electrical properties at a given operating temperature), and stator winding current wave shape (defined by its Fourier harmonic components—amplitude and rotor speed based frequency). The thicknesses $t_1$ and $t_2$ are computed to reduce the total rotor surface loss, while providing a desirable strength and adhesion properties. Further, the thicknesses $t_1$ and $t_2$ may depend on the nature of the process used for plating, such as electroplating, hot isostatic pressing and/or high-velocity powder spraying, which are discussed in greater detail below. In one specific embodiment, the thicknesses $t_1$ and $t_2$ may be computed by an iterative method implemented by a computer program that accepts design parameters of the electrical machine 10, rotor 14 and/or stator 12 as inputs to arrive at optimal values of the thicknesses t1 and t2.

Figure 3:
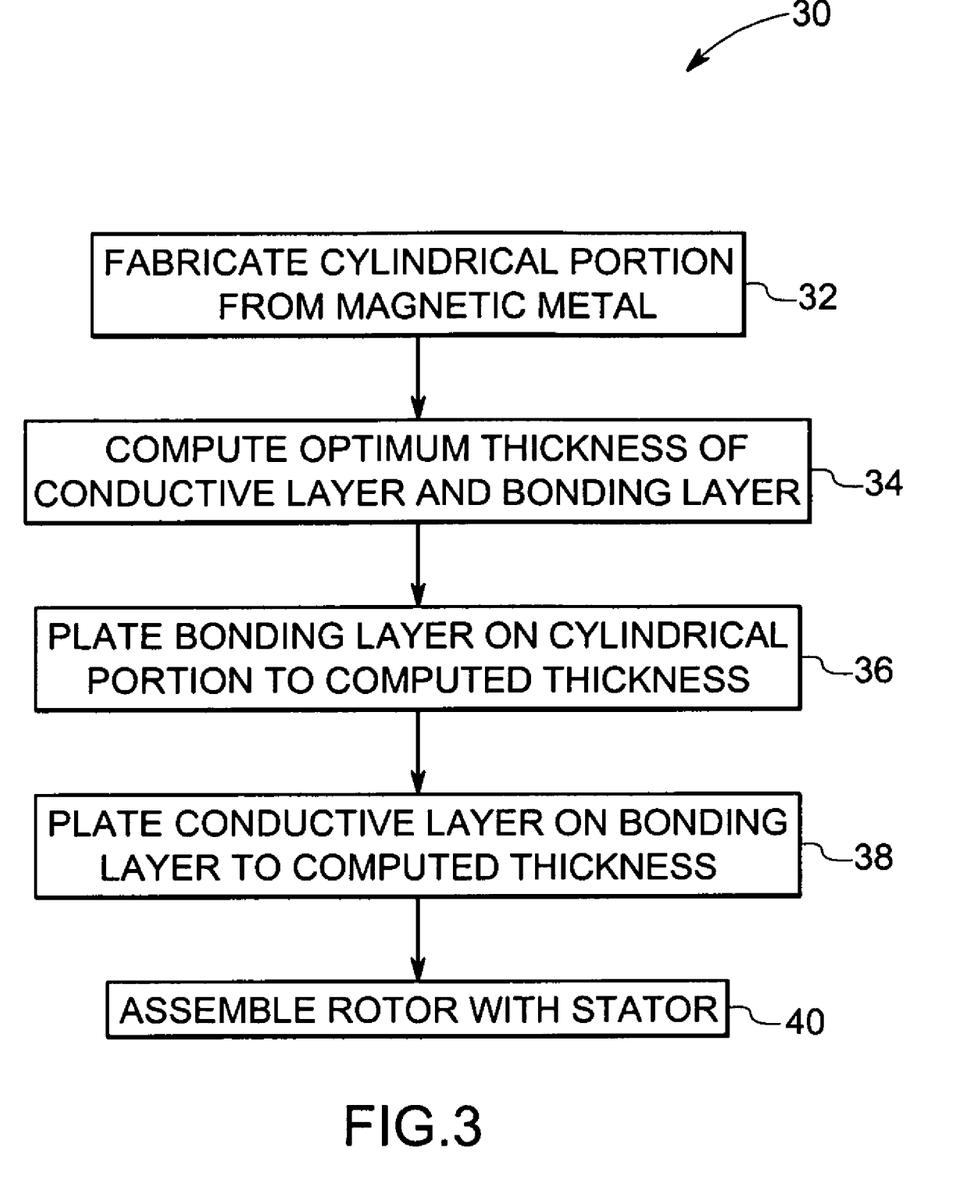
FIG. 3 is a flowchart of an exemplary method for manufacturing the rotor of FIG. 2 in accordance with one embodiment of the present techniques.

FIG. 3 is a flow chart illustrating an exemplary process 30 for manufacturing a windingless rotor for an electrical machine, such as the electrical machine 10 of FIG. 1, in accordance with one embodiment of the present techniques. The process 30 begins at block 32. In block 32, a generally cylindrical portion of the rotor may be fabricated from a magnetic material, such as magnetic steel. This fabrication may include forging a cylindrical shaped portion from a block of magnetic steel. At block 34, the optimal thicknesses of the highly conductive layer and/or the bonding layer may be computed based on design parameters of the electrical machine, as described above.

Once the thicknesses of the conductive layer and the bonding layer are computed, the bonding layer is applied over the surface of the cylindrical portion based on a calculated thickness of the bonding layer, as shown in block 36 following the surface preparation of the magnetic rotor 18. The bonding layer may not be applied over the entire cylindrical portion, but may cover a portion of the rotor. Next, at block 38, the conductive layer is applied over the bonding layer. Similar to the bonding layer, the conductive layer may not be applied over the entire cylindrical portion, but may cover specific portions of the cylindrical section. The application of the bonding and conductive layers in blocks 36 and 38 may be performed in a variety of electro-chemical and metallurgical bonding processes. For instance, in one embodiment, the conductive layer may be electroplated over the surface of the cylindrical section. Electroplating is useful because it provides a smooth surface finish of the conductive layer. This smooth surface reduces windage losses in high-speed electrical machines. Further, the process of electroplating produces reduced porosity in the conductive layer 26, which results in higher electrical conductivity of the conductive layer. The electroplating process also provides control over the plating rates to enable the conductive layer to be applied to a specific thickness. Still further, the electroplating process may be configured to provide desirable adhesion properties that have a high bond-strength, which is advantageous for high-speed applications, as discussed above. These adhesion properties may also be enhanced by disposing a bonding layer between the cylindrical portion and the conductive layer.

In addition to the electroplating process, it should be appreciated that plating of the bonding and conductive layers over the cylindrical section may also be performed via other electrochemical or metallurgical bonding processes, such as electroless plating, hot isostatic pressing and high-velocity powder spraying, etc. Electroless plating is a chemical plating method not requiring electricity; hot isostatic pressing is a process that consolidates metals using high pressures and temperatures, usually starting with metallic powders. Similarly, high velocity powder spraying consolidates metallic powders into a coating by throwing them against a metallic surface with a velocity high enough to partially melt them.

Once the conductive layer is applied to the bonding layer or cylindrical portion, the rotor may be assembled with a stator. As shown in block 40, the rotor may be assembled by axially aligning the rotor within the central opening of the stator. The assembly of the rotor and stator may include other steps, such as coupling other control circuits to the stator and rotor and forming the frame around the assembled rotor and stator. Thus, other assembling steps may be performed to complete the electrical machines assembly.

Figure 4:
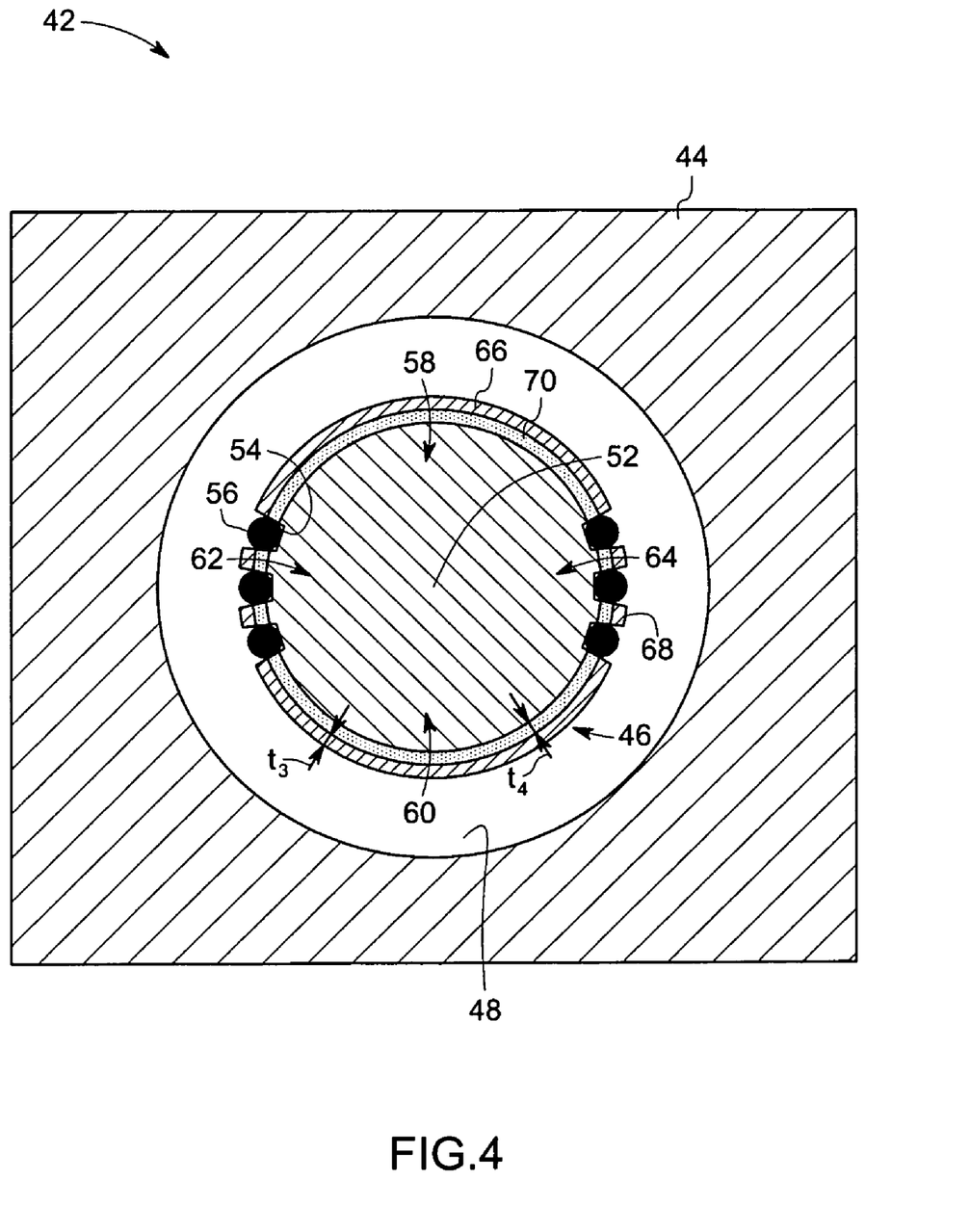
FIG. 4 is a cross-sectional of a stator and rotor having slots for field windings formed in accordance with another embodiment of the present techniques.

Similar to the techniques discussed above with regard to FIGS. 2 and 3, the plating of a conductive layer may also be utilized for rotors having field windings as illustrated in FIG. 4. FIG. 4 illustrates a front view of an electrical machine 42 having a stator 44 and a rotor 46 disposed inside a longitudinal opening 48 in the center of the stator 44. The stator 44 and rotor 46 may operate and function similar to the stator and rotor discussed above with regards to FIGS. 2 and 3.

However, the rotor 46 in this embodiment may be configured to support windings. For instance, the rotor 46 may include a generally cylindrical portion 52, which may be made of a magnetic material. The cylindrical portion 52 may have longitudinal slots 54 that are machined on the surface of the cylindrical portion 52. The longitudinal slots 54 may be configured to support field windings 56. The field windings 56, when energized, create magnetic poles 58 and 60 on the surface of the rotor 46.

Similar to the discussion above, the rotor 46 includes a conductive layer 66 comprising a highly conductive material plated over the pole faces 58 and 60 as well as teeth 68 of conducting region 62 and 64. As in the earlier embodiment, the conductive layer 66 has specified thickness $t_3$ that is configured to reduce losses from eddy currents in the pole faces and the teeth 68 in the conducting regions. Also, a bonding layer 70 may be disposed between the cylindrical portion 52 and the conductive layer 66 to a specified thickness $t_4$ to improve adhesion properties between the conductive layer 66 and the cylindrical section, as discussed above. The thicknesses $t_3$ and $t_4$ of the conductive layer 66 and the bonding layer 70 may be determined based on design parameters of the electrical machine 42, similar to the discussion above.

Figure 5:
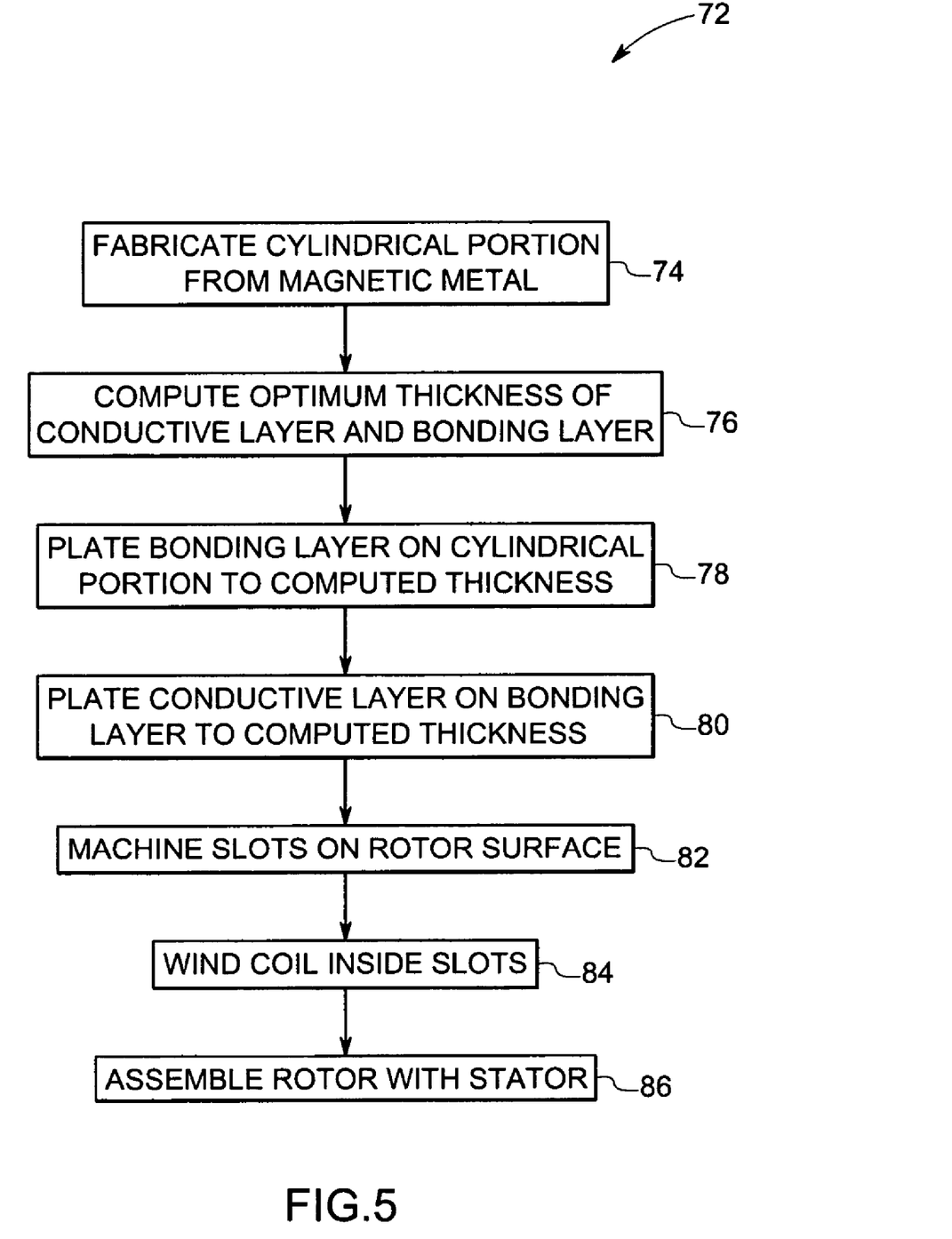
FIG. 5 is a flowchart of an exemplary method for manufacturing the rotor of FIG. 4 in accordance with one embodiment of the present techniques.

FIG. 5 is a flow chart illustrating an exemplary process 72 for manufacturing a rotor with winding slots in accordance with another embodiment of the present techniques. In this embodiment, the general manufacturing process is similar to the discussion above regarding the windingless rotor. As such, the blocks 74-80 are similar in principle to blocks 32-38 of FIG. 3.

However, unlike the above referenced process, the rotor for this process has slots machined into the rotor for the windings. For instance, at block 82, longitudinal slots are machined on the surface of the rotor after plating the surface with a high-conductivity material. Plating is performed prior to machining of the slots to yield a uniform thickness of the high-conductivity material over the teeth and the pole faces, thus reducing windage losses at high-speed operations. The process 72 then proceeds at block 84 by winding coils on the slots machined on the rotor surface. Once the coils are in place, the rotor may be assembled inside the stator, as shown in block 86.

The above-described plating techniques are also helpful in reducing losses in certain components within the stator of an electrical machine. An example of such a component is a stator core clamping flange. The present technique may be advantageous in reducing eddy currents in the stator core clamping flange surface, while providing a relatively simple mechanical structure. The use of these techniques with the stator core clamping flange is shown in greater detail in FIG. 6.

Figure 6:
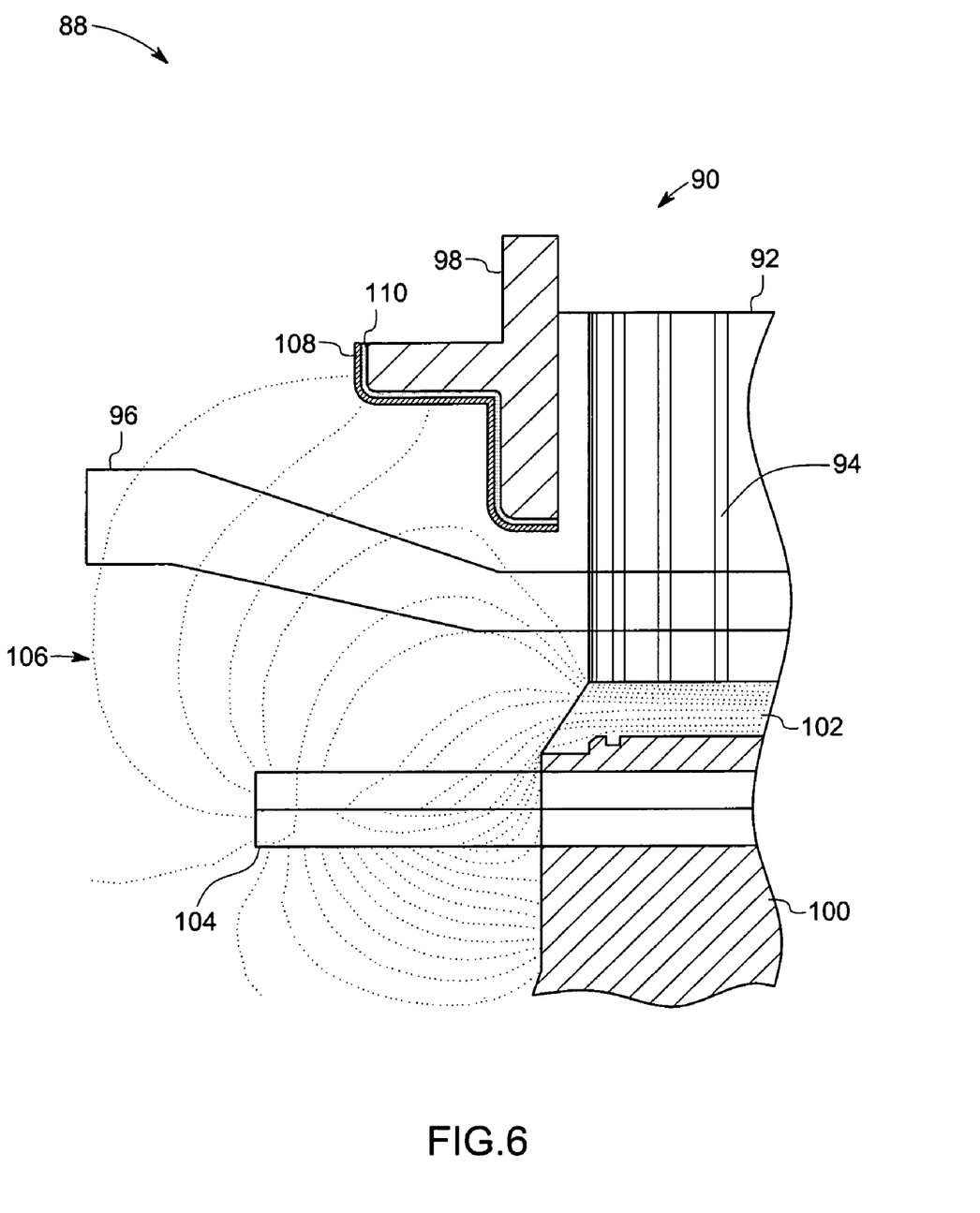
FIG. 6 is a front elevation cross-sectional view of rotor and a stator having a core clamping flange in accordance with an embodiment of the present technique.

FIG. 6 illustrates an exemplary electrical machine 88 in accordance with the aforementioned embodiment. The electrical machine 88 includes a stator member 90 having a stator core 92 formed of a plurality of laminations 94 of a magnetic material. The stator member 90 further includes armature windings 96 coiled around the laminated stator core 92. The stator core 92 is clamped on both sides (one side shown) by a core clamping flange 98. A rotor 100 is disposed within the stator core 92 and may include field windings 102. Certain embodiments of the rotor 100 may not include field windings as discussed above. The rotor 100 is separated from the stator core 92 by an airgap 104.

During operation of the electrical machine 88, magnetic flux 106 from the rotor 100 may be linked to the stator core 92 and the core clamping flange 98. Due to laminations 94 in the stator core 92, flux linked to the stator core 92 may not produce significant eddy currents on the stator core 92. However, eddy currents may be formed on the surface of the core clamping flange 98, which results in the temperature of the core clamping flange 98 increasing. While conductive shields may be used to shield the core clamping flange 98 from eddy currents caused by the flux linked to it, these shields generally need to be hung away from the core clamping flange 98 to allow for a cooling medium to pass between them, which make for a complex mechanical structure.

Accordingly, with the present technique, a conductive layer 108 is plated over the surface of the core clamping flange 98 via any of the electrochemical or metallurgical processes, as discussed above. In certain embodiments, the conductive layer 108 may comprise, for example copper, or copper alloys as discussed earlier. Additionally, a bonding layer 110 may be disposed between the conducting layer 108 and the core clamping flange 98, to achieve desirable adhesion properties, as discussed earlier. The conductive layer 108 may also be adapted to reduce eddy current losses in the core clamping flange 98 caused by fundamental frequency and high frequency harmonics. In such embodiments, however, alternative cooling techniques may be employed, such as using a hollowed flange with forced fluid cooling, to provide additional heat dissipation.

Beneficially, the present techniques provide a cost effective process to control surface properties of rotors and other components in high-speed electrical machines. These techniques may reduce motor losses and optimize transient behavior for the electrical machine. The techniques described are particularly advantageous because they enable surface properties to be designed for reducing losses. Further, the techniques provide control over the thicknesses and conductivities of the conductive layers applied to the surface of the rotor and other components. Thus, the present techniques improve the efficiency of the electrical machine and reduce the negative influence of transient behavior.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electrical machine, comprising:
a stator having a central opening; and
a rotor disposed within the central opening and comprising:
a generally cylindrical first section comprising a first material, the first section directly mounted on an axially extending shaft within the central opening; and
a second section comprising a second material plated directly on at least a portion of the first section, the second section having a predetermined thickness, wherein the second material has a higher electrical conductivity relative to the first material.

2. The electrical machine of claim 1, wherein the second section is plated over the first section via at least one of electroplating, electroless plating, hot isostatic pressing, or high velocity powder spraying.

3. The electrical machine of claim 1, wherein the first material comprises magnetic steel.

4. The electrical machine of claim 1, wherein the second material comprises one of copper, silver, or a combination of copper and silver.

5. The electrical machine of claim 1, wherein the rotor includes a third section disposed between the first section and the second section, the third portion configured to provide an adhesive surface to strengthen the plating of the second section over the first section.

6. The electrical machine of claim 5, wherein the third material comprises nickel.

7. The electrical machine of claim 1, wherein the predetermined thickness is based on at least one of stator winding characteristics, geometetries of the stator and the rotor, material properties of the first and second sections, stator winding current shape, or combinations thereof.

8. The electrical machine of claim 1, wherein the electrical machine is configured to operate for high speed operation.

9. The electrical machine of claim 1, wherein the first section comprises a plurality of pole faces and a plurality of conducting regions, and wherein the second section is plated over the plurality of pole faces and a plurality of protruding surfaces in the plurality of conducting regions.

10. A rotor for and electrical machine, comprising:
a generally cylindrical first portion comprising a first material and mounted directly on a shaft; and
a second portion comprising a conductive layer of a second material plated directly on the first portion, the conductive layer having predetermined thickness, wherein the second material has a higher electrical conductivity relative to the first material.

11. The rotor of claim 10, wherein the second section is plated over the first section via at least one of the electroplating, electrodes plating, hot isostatic pressing, or high velocity powder spraying.

12. The rotor of claim 10, wherein the first material comprises magnetic steel.

13. The rotor of claim 10, wherein the second material comprises one of copper, silver, or a combination of copper and silver.

14. The rotor of claim 10, further including a including a third section disposed between the first section and the second section, the third portion configured to provide an adhesive surface to strengthen the plating of the second section over the first section.

15. The rotor of claim 10, wherein the third material comprises nickel.

16. The rotor of claim 10, wherein the predetermined thickness is based on at least one of stator winding characteristics, geometries of the stator and the rotor, material properties of the first and second sections, stator winding current shape, or combinations thereof.

17. The rotor of claim 10, comprising a plurality of pole faces and conducting regions, and wherein the second section is plated over the pole faces and a plurality of protruding surfaces in the conducting regions.

* * * * *

UNITED STATES PATENT AND TRADEMARK OFFICE
CERTIFICATE OF CORRECTION

PATENT NO. : 7,723,894 B2  Page 1 of 1
APPLICATION NO. : 11/018592
DATED : May 25, 2010
INVENTOR(S) : Bray et al.

It is certified that error appears in the above-identified patent and that said Letters Patent is hereby corrected as shown below:

In Column 5, Line 58, delete "t1 and t2." and insert -- $t_1$ and $t_2$. --, therefor.

In Column 9, Line 1, in Claim 7, delete "geometetries" and insert -- geometries --, therefor.

In Column 9, Line 11, in Claim 10, delete "and" and insert -- an --, therefor.

In Column 9, Line 21, in Claim 11, after "one of" delete "the".

In Column 9, Line 22, in Claim 11, delete "electrodes" and insert -- electroless --, therefor.

Signed and Sealed this

Twenty-third Day of November, 2010

David J. Kappos
*Director of the United States Patent and Trademark Office*